US010466062B2

(12) United States Patent
Maruyama et al.

(10) Patent No.: US 10,466,062 B2
(45) Date of Patent: Nov. 5, 2019

(54) VEHICULAR DISPLAY DEVICE (71) Applicant: NISSAN MOTOR CO., LTD., Kanagawa (JP)

(72) Inventors: Kenji Maruyama, Kanagawa (JP); Hiroshi Watanabe, Kanagawa (JP); Norio Kosaka, Kanagawa (JP); Masayuki Shishido, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/765,190

(22) PCT Filed: Sep. 30, 2015

(86) PCT No.: PCT/JP2015/077666
§ 371 (c)(1),
(2) Date: Mar. 30, 2018

(87) PCT Pub. No.: WO2017/056210
PCT Pub. Date: Apr. 6, 2017

(65) Prior Publication Data
US 2018/0292229 A1 Oct. 11, 2018

(51) Int. Cl.
G01C 21/36 (2006.01)
G02B 27/01 (2006.01)
B60K 35/00 (2006.01)

(52) U.S. Cl.
CPC .......... G01C 21/3647 (2013.01); B60K 35/00 (2013.01); G01C 21/36 (2013.01); G01C 21/367 (2013.01); G02B 27/01 (2013.01); G02B 27/0101 (2013.01); B60K 2370/1529 (2019.05); B60K 2370/166 (2019.05); B60K 2370/177 (2019.05); B60K 2370/188 (2019.05);
(Continued)

(58) Field of Classification Search
CPC .. G01C 21/3647; G01C 21/367; B60K 35/00; B60K 2350/2013; B60K 2350/2008; B60K 2350/2052; G02B 27/0101
See application file for complete search history.

(56) References Cited

U.S. PATENT DOCUMENTS 5,936,631 A 8/1999 Yano et al.
8,180,567 B2 5/2012 Geelen et al.
8,212,662 B2 7/2012 Sasaki et al.
(Continued)

FOREIGN PATENT DOCUMENTS

JP H08-201086 A 8/1996
JP 2005-59660 A 3/2005
(Continued)

Primary Examiner — Charles J Han
(74) Attorney, Agent, or Firm — Osha Liang LLP (57) ABSTRACT A front object determiner determines an object on a traveling road surface in front of a host vehicle based on an image of a forward view captured by a front camera. A display controller draws an overlapping portion where a guide route calculated by a navigation device and the object determined by the front object determiner overlap each other in a display region on a windshield and a non-overlapping portion where the guide route and the object do not overlap each other in the display region on the windshield such that the overlapping portion is to be presented in a mode different from a mode for the non-overlapping portion.

5 Claims, 10 Drawing Sheets (52) U.S. Cl.
  CPC .... *B60K 2370/191* (2019.05); *B60K 2370/21* (2019.05); *B60K 2370/334* (2019.05)

(56) References Cited

U.S. PATENT DOCUMENTS

| | | | |
|---|---|---|---|
| 8,352,180 B2 | 1/2013 | Geelen et al. | |
| 2005/0154505 A1* | 7/2005 | Nakamura | G01C 21/365 701/1 |
| 2009/0005961 A1* | 1/2009 | Grabowski | G01C 21/365 701/532 |
| 2009/0125234 A1 | 5/2009 | Geelen et al. | |
| 2010/0164702 A1 | 7/2010 | Sasaki et al. | |
| 2011/0001751 A1 | 1/2011 | Carlsson et al. | |
| 2012/0185165 A1* | 7/2012 | Geelen | G01C 21/3647 701/436 |
| 2012/0191346 A1 | 7/2012 | Geelen et al. | |

FOREIGN PATENT DOCUMENTS

| | | |
|---|---|---|
| JP | 2008-542746 A | 11/2008 |
| JP | 2010-156608 A | 7/2010 |
| JP | 2013-196359 A | 9/2013 |
| JP | 2014-185926 A | 10/2014 |
| KR | 10-2013-0068924 A | 6/2013 |

\* cited by examiner

VEHICULAR DISPLAY DEVICE

BACKGROUND

Technical Field

The present invention relates to a vehicular display device which displays information in a vehicle.

Related Art

As a conventional vehicular display device, there is known a head-up display (HUD) device for augmented reality (AR) display which displays an image in a manner superimposed on an outside view ahead of a windshield (see Patent Literature 1). The head-up display displays coin-shaped icons in a manner superimposed on a forward view in a traveling direction on a road on which a vehicle is traveling.

CITATION LIST

Patent Literature

Patent Literature 1: Japanese Patent Application Publication No. 2013-196359

SUMMARY OF INVENTION

In Patent Literature 1, the head-up display is used in combination with a navigation device, a vehicle condition sensor, an external sensor, a vehicle communication device, and the like to display images in a manner superimposed on attention targets such as, for example, road signs and road surface signs. However, in Patent Literature 1, when there is an object near the attention target and the displayed image overlaps this object, the displayed image is difficult to read.

One or more embodiments of the present invention provides a vehicular display device which allows easy reading of display even when the display is over an object.

In a vehicular display device according to one or more embodiments of the present invention, a front object determiner determines an object on a traveling road surface in front of a host vehicle based on an image of a forward view captured by a front camera. A display controller draws an overlapping portion where a guide route calculated by a navigation device and the object determined by the front object determiner overlap each other in a display region on a windshield and a non-overlapping portion where the guide route and the object do not overlap each other in the display region on the windshield such that the overlapping portion is to be presented in a mode different from a mode for the non-overlapping portion.

DETAILED DESCRIPTION

A vehicular display device according to embodiments of the present invention is described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
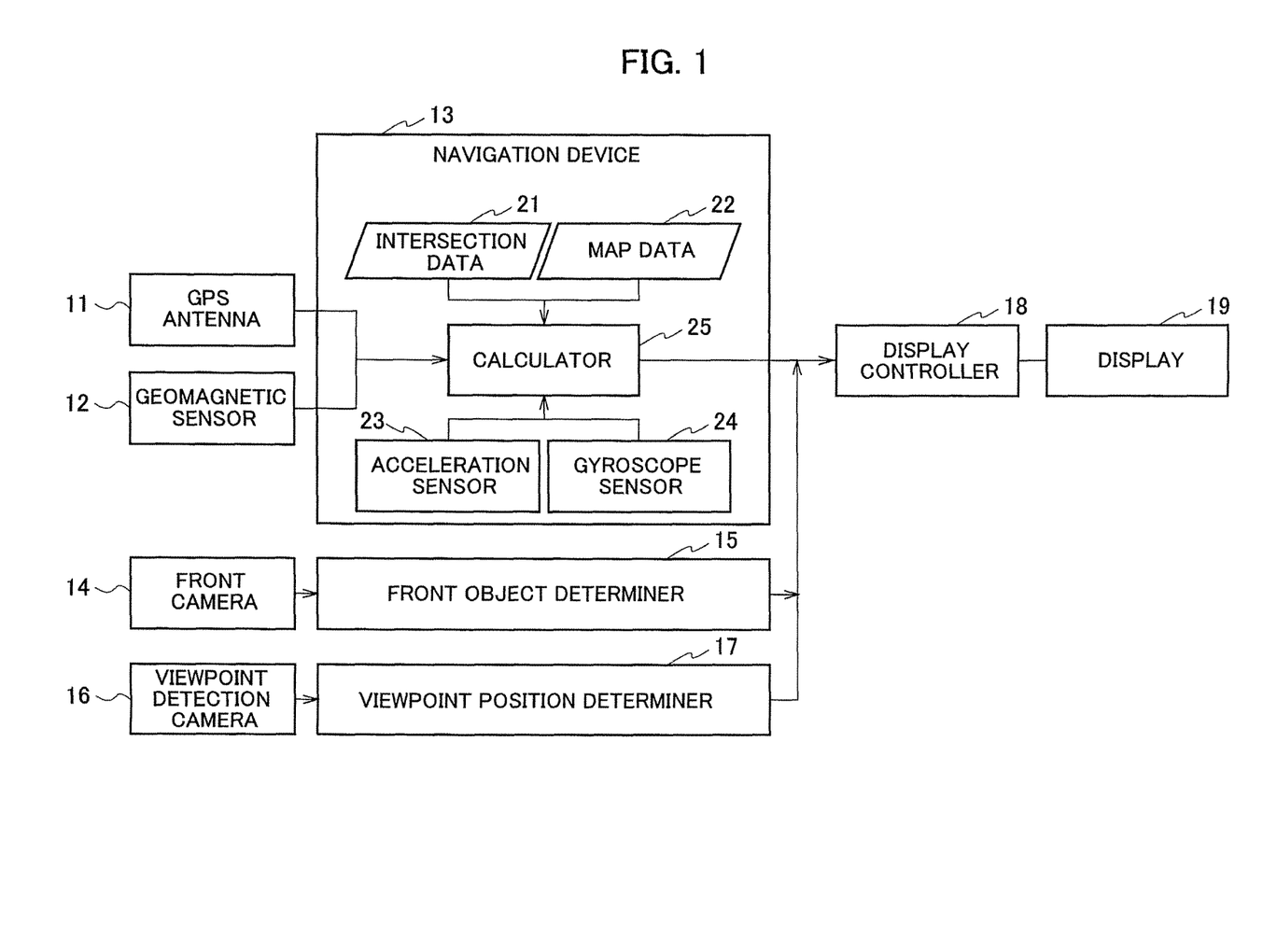
FIG. 1 is a diagram illustrating a configuration of a vehicular display device according to one or more embodiments of the present invention.

FIG. 1 is a diagram illustrating a configuration of a vehicular display device according to one or more embodiments of the present invention. The vehicular display device displays a guide route to a destination of a host vehicle. The vehicular display device includes a GPS (Global Positioning System) antenna 11, a geomagnetic sensor 12, a navigation device 13, a front camera 14, and a front object determiner 15. The vehicular display device further includes a viewpoint detection camera 16, a viewpoint position determiner 17, a display controller 18, and a display 19.

The GPS antenna 11 receives GPS signals from not-illustrated GPS satellites and outputs the received GPS signals to the navigation device 13 as GPS information. The geomagnetic sensor 12 detects azimuth of the direction in which the vehicle is facing (azimuth of the traveling direction of the vehicle) and outputs the detected azimuth to the navigation device 13 as azimuth information.

The navigation device 13 calculates the guide route along which the host vehicle is to be guided to travel, by using the GPS information from the GPS antenna 11, the azimuth information from the geomagnetic sensor 12, and information acquired in itself, and outputs the guide route to the display controller 18. The navigation device 13 extracts a shape of an intersection in front of the host vehicle based on map data 22 and the current position of the host vehicle indicated by the GPS information from the GPS antenna 11. The navigation device 13 generates intersection profile information indicating the shape of the extracted intersection and outputs the intersection profile information to the display controller 18. The details of the navigation device 13 are described later.

The front camera 14 captures an image of a forward view ahead of the host vehicle and outputs the captured image of the forward view to the front object determiner 15 as forward image information.

The front object determiner 15 determines an object on a traveling road in front of the host vehicle based on the forward image information sent from the front camera 14 and outputs the determination result to the display controller 18 as object information.

The viewpoint detection camera 16 captures an image including the positions of the eyes of a driver and outputs the captured image to the viewpoint position determiner 17 as viewpoint image information.

The viewpoint position determiner 17 determines a viewpoint position of the driver based on the viewpoint image information sent from the viewpoint detection camera 16 and outputs the determination result to the display controller 18 as viewpoint position information.

The display controller 18 receives the guide route information and the intersection profile information sent from the navigation device 13, the object information sent from the front object determiner 15, and the viewpoint position information sent from the viewpoint position determiner 17. The display controller 18 generates an image to be displayed on the display 19 based on the guide route information, the intersection profile information, the object information, and the viewpoint position information, and outputs the generated image to the display 19 as display image information. The display controller 18 draws the guide route calculated by the navigation device 13 such that a portion where the guide route and the object determined by the front object determiner 15 overlap each other in a display region on a windshield is presented in a mode different from a mode for a portion where the guide route and the object do not overlap each other in the display region on the windshield, and outputs the image to the display 19 as the display image information.

The display 19 includes a projection unit which projects a video, a screen and a Fresnel mirror which reflect the video, and the like, and displays an image in the display region provided to overlap the position of the windshield included in the vehicle. Particularly, the display 19 is a head-up display which can display the image in a manner superimposed on the forward view ahead of the vehicle by displaying the image reflected by a mirror, on a near side of the windshield as a virtual image. However, the display 19 is not limited to this type of head-up display. For example, the display 19 may be a combiner type head-up display using a transparent panel instead of displaying the image on the windshield or may employ a method of directly displaying the image on the windshield. In other words, the head-up display in one of more of the embodiments may be any type as long as the driver can see the information, displayed by the head-up display in a manner superimposed on a view seen by the driver from the windshield, without looking down. Note that the display 19 corresponds to a display described according to one or more embodiments of the present invention.

Next, the details of the aforementioned navigation device 13 are described. The navigation device 13 includes intersection data 21, the map data 22, an acceleration sensor 23, a gyroscope sensor 24, and a calculator 25.

The intersection data 21 is data indicating characteristics and the like of each intersection and is acquired from, for example, a disc device or a center via a communication line and a communication device (both are not illustrated). The intersection data is read by the calculator 25.

The map data 22 is data acquired from, for example, the disc device or the center via the communication line and the communication device like the intersection data 21, and is used for drawing of a map, calculation of the guide route, generation of the guide route information, and the like. The map data 22 is read by the calculator 25.

The acceleration sensor 23 detects the acceleration of the host vehicle and outputs the detected acceleration to the calculator 25 as the acceleration information.

The gyroscope sensor 24 detects the angular velocity of the host vehicle and outputs the detected angular velocity to the calculator 25 as angular velocity information.

The calculator 25 calculates the current position of the host vehicle by using the map data 22 and the GPS information sent from the GPS antenna 11. In the calculation, the vehicle sometimes cannot receive the GPS signals when traveling, for example, in a tunnel, under an elevated road, or between tall buildings. Accordingly, the calculator 25 calculates the current position by autonomous navigation based on the map data 22, the azimuth information from the geomagnetic sensor 12, the acceleration information from the acceleration sensor 23, and the angular velocity information from the gyroscope sensor 24. The calculator 25 outputs the guide information created based on the calculated current position to the display controller 18.

Next, an operation of the vehicular display device according to one or more embodiments of the present invention configured as described above is described with reference to the flowchart illustrated in FIG. 2.

When the operation is started, an intersection guide flag is first acquired (step S11). Specifically, the display controller 18 acquires the intersection guide flag from the navigation device 13. Here, the intersection guide flag is a flag indicating whether the route guidance or the like at an intersection is to be performed or not, and the route guidance or the like is performed at the intersection only when the intersection guide flag is set to on.

Next, whether the intersection guide flag is on or not is checked (step S12). Specifically, the display controller 18 checks whether the intersection guide flag acquired in step S11 is on or not. When the intersection guide flag is not on in step S12, the display controller 18 determines that the intersection guide is unnecessary, and the processing is terminated.

Meanwhile, when the intersection guide flag is determined to be on in step S12, next, the guide route information is acquired (step S13). Specifically, the display controller 18 acquires the guide route information from the navigation device 13. The guide route information is calculated in advance and stored in the navigation device 13.

Next, the viewpoint position is acquired (step S15). Specifically, the display controller 18 acquires the viewpoint position information from the viewpoint position determiner 17.

Then, information on an object in front of the host vehicle is acquired (step S16). Specifically, the display controller 18 acquires the object information obtained by determining an object near an attention target and in front of the host vehicle, from the front object determiner 15.

Next, a portion of the guide route which overlaps the object in front of the vehicle is determined (step S17). Specifically, the display controller 18 determines a portion where the object indicated by the object information acquired from the front object determiner 15 and the guide route indicated by the guide route information acquired from the navigation device 13 overlap each other in the display region on the windshield. For example, in a general example illustrated in FIG. 3, three intermittent arrows A1, A2, and A3 indicating the guide route are determined to overlap an object C (vehicle in this example) in the display region on the windshield. Note that three intermittent arrows B1, B2, and B3 indicating the guide route are portions not overlapping the vehicle C in the display region on the windshield. Moreover, examples of the object C include a person, other traffic objects, obstacles, and the like.

Figure 4:
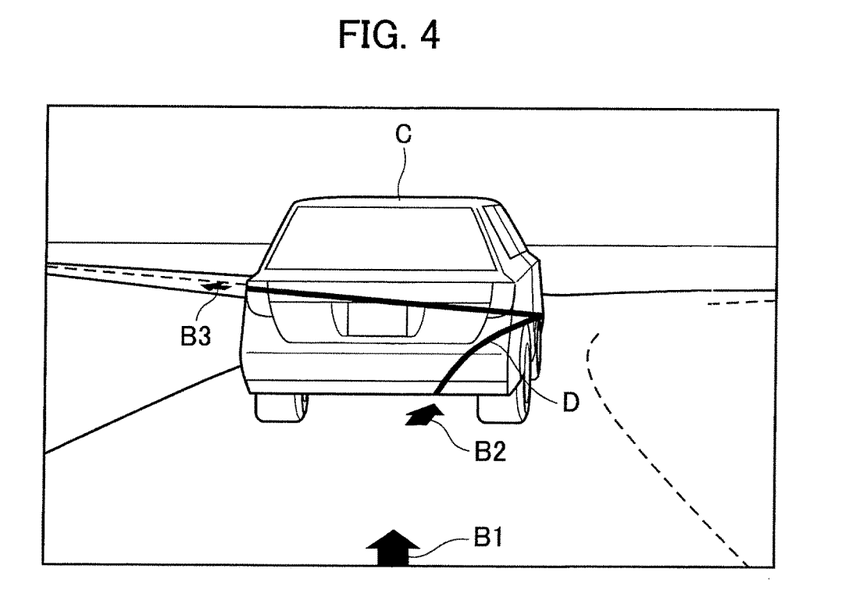
FIG. 4 is a view illustrating an example in which a guide route in a portion where the guide route and the object overlap each other in a display region on a windshield is displayed by using a continuous line in the vehicular display device according to one or more embodiments of the present invention.

Next, drawing of continuous display is performed (step S19). Specifically, as illustrated in FIG. 4, the display controller 18 draws the guide route in the portion where the guide route determined in step S17 and the object C overlap each other in the display region on the windshield, by using a continuous figure, specifically, a continuous line D.

Then, drawing of intermittent display is performed (step S20). Specifically, as illustrated in FIG. 4, the display controller 18 draws the guide route in the portion where the guide route determined in step S17 and the object C do not overlap each other in the display region on the windshield, by using an intermittent figure, specifically, the intermittent arrows B, B2, and B3.

Next, the display image is outputted to the display 19 (step S23). Specifically, the display controller 18 outputs the images drawn in step S19 and step 20 to the display 19 as display image information.

The display 19 thereby generates an image based on the display image information from the display controller 18 and projects the image on the windshield to display the image directly within the field of view of a person. Thereafter, the sequence returns to step S12 and the aforementioned processes are repeated.

In the vehicular display device according to one or more embodiments of the present invention, the display controller 18 draws the guide route in the portion where the guide route and the object C determined by the front object determiner 15 overlap each other by using the continuous line D and draws the guide route in the portions where the guide route and the object C do not overlap each other by using the intermittent arrows B1, B2, and B3, in the display region on the windshield. The display 19 displays the image drawn by the display controller 18. Accordingly, the driver can easily read the displayed image even when the display is over an object near an attention target (guide route, road sign, road surface sign).

Moreover, when the entire guide route is displayed by using a continuous figure, the amount of calculation for the display is large. However, the amount of calculation can be reduced by limiting the continuous display to the portion overlapping the object C. Accordingly, the calculation resource which can be allocated to other display can be increased.

Figure 5:
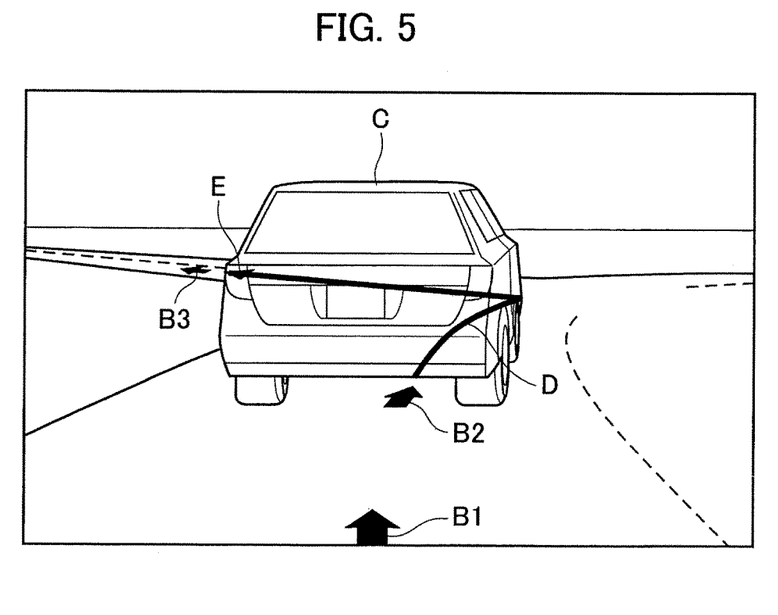
FIG. 5 is a view illustrating an example in which the guide route in the portion where the guide route and the object overlap each other in the display region on the windshield is displayed by using a continuous line with an arrow at a front end in the vehicular display device according to one or more embodiments of the present invention.

Note that, as illustrated in FIG. 5, the drawing may be performed such that an arrow E indicating the traveling direction is added to a front end of the continuous line D. This makes clearer the direction in which the host vehicle should travel in the intersection.

Figure 6:
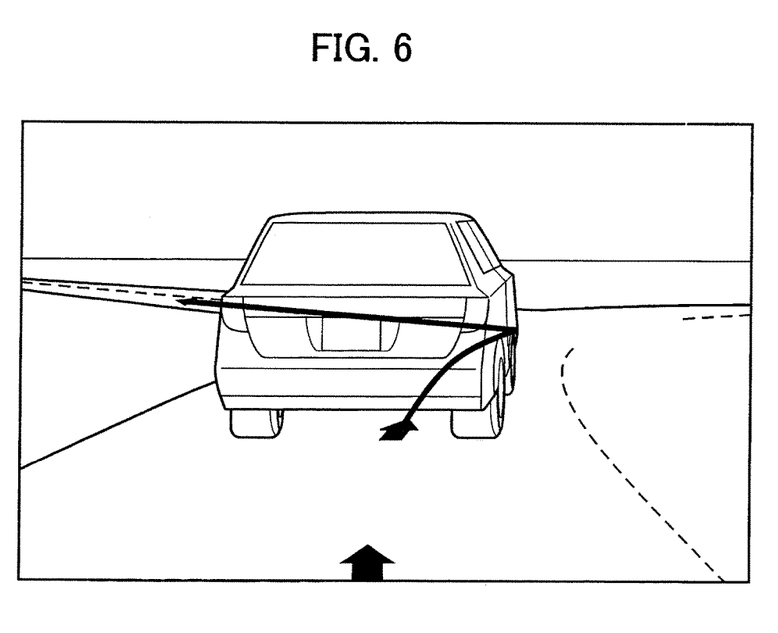
FIG. 6 is a view illustrating an example in which the guide route in the portion where the guide route and the object overlap each other in the display region on the windshield is displayed by using an extended continuous line in the vehicular display device according to one or more embodiments of the present invention.

Moreover, as illustrated in FIG. 6, the drawing may be performed such that both ends D1 and D2 of the continuous line D are extended to the intermittent arrows B2 and B3 outside the contour of the object C. This can make the guide route drawn by the continuous line D and the intermittent arrows B2 and B3 more noticeable.

Figure 7:
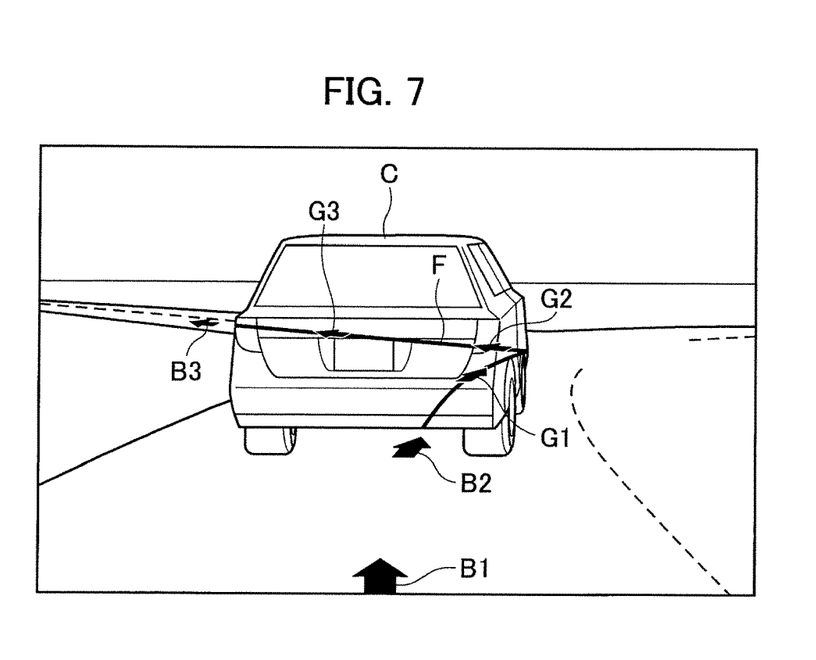
FIG. 7 is a view illustrating an example in which the guide route in the portion where the guide route and the object overlap each other in the display region on the windshield is displayed by using a combination of a continuous line and intermittent arrows in the vehicular display device according to one or more embodiments of the present invention.

Furthermore, as illustrated in FIG. 7, a continuous line F and intermittent arrows G1, G2, and G3 may be displayed in combination. In this case, according to one or more embodiments of the present invention, the drawing is performed such that the color of the continuous line F is different from the color of the intermittent arrows G1, G2, and G3. In this configuration, since the continuous line D as illustrated in FIG. 4 is drawn in addition to the intermittent arrows A1, A2, and A3 as illustrated in FIG. 3, the guide route is emphasized and recognition thereof is facilitated.

Figure 3:
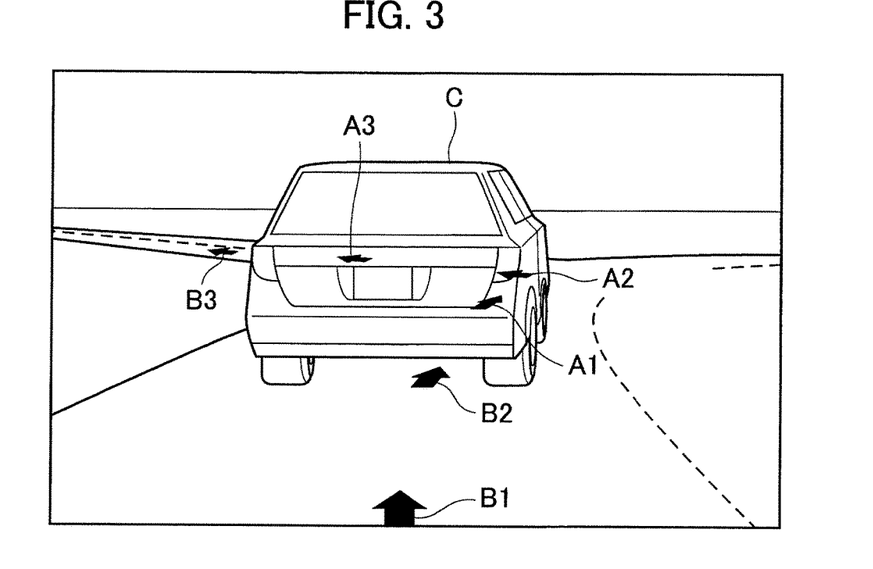
FIG. 3 is a view for explaining a state where a guide route and an object overlap each other in the vehicular display device according to one or more embodiments of the present invention.
Figure 8:
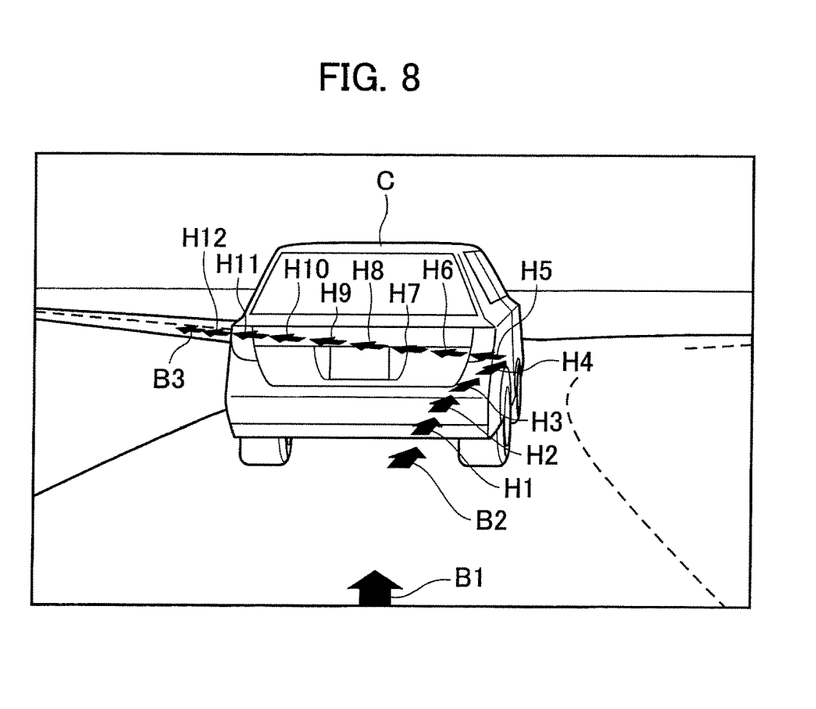
FIG. 8 is a view illustrating an example in which the guide route in the portion where the guide route and the object overlap each other in the display region on the windshield is displayed by using intermittent lines arranged at smaller intervals in the vehicular display device according to one or more embodiments of the present invention.

Moreover, as illustrated in FIG. 8, the display may be performed such that intermittent arrows H1 to H12 are drawn at smaller intervals than intervals (predetermined intervals) between the arrows A1, A2, and A3 (composing elements) in the general example illustrated in FIG. 3. Alternatively, the displayed may be performed such that the number of arrows (composing elements) is increased from the number (predetermined number) of the arrows A1, A2, and A3 (composing elements) in the general example illustrated in FIG. 3. In this configuration, it is easier to recognize the guide route than in the case where the guide route is drawn by using only a line.

Figure 9:
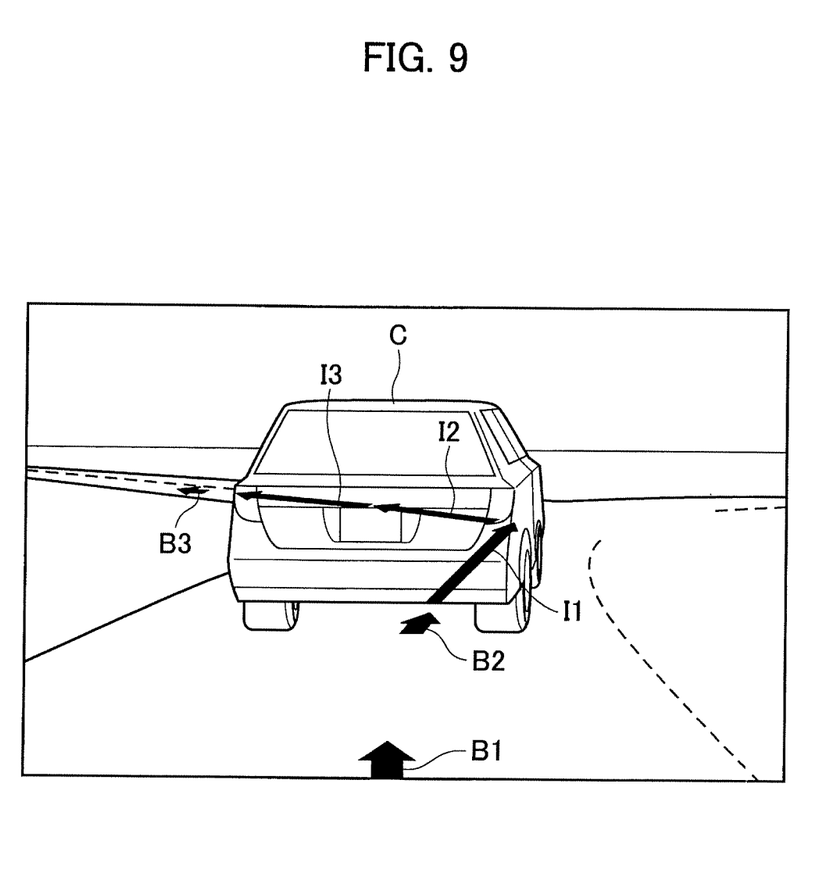
FIG. 9 is a view illustrating an example in which the guide route in the portion where the guide route and the object overlap each other in the display region on the windshield is displayed by using intermittent arrows whose shapes and sizes are changed in the vehicular display device according to one or more embodiments of the present invention.

Furthermore, as illustrated in FIG. 9, the display may be performed such that an intermittent figure, specifically, intermittent arrows I1, I2, and I3 are displayed with at least one of the shapes or the sizes of the arrows I1, I2, and I3 being changed. In this configuration, the guide route is made more noticeable and it is easier to recognize the direction in which the vehicle should travel than in the case where the guide route is drawn by using only a line.

A configuration of a vehicular display device according to one or more embodiments of the present invention described below is similar to the configuration of the vehicular display device according to one or more embodiments of the present invention illustrated in FIG. 1, but the operation thereof is different. Accordingly, description is given below mainly of the operation.

Figure 10:
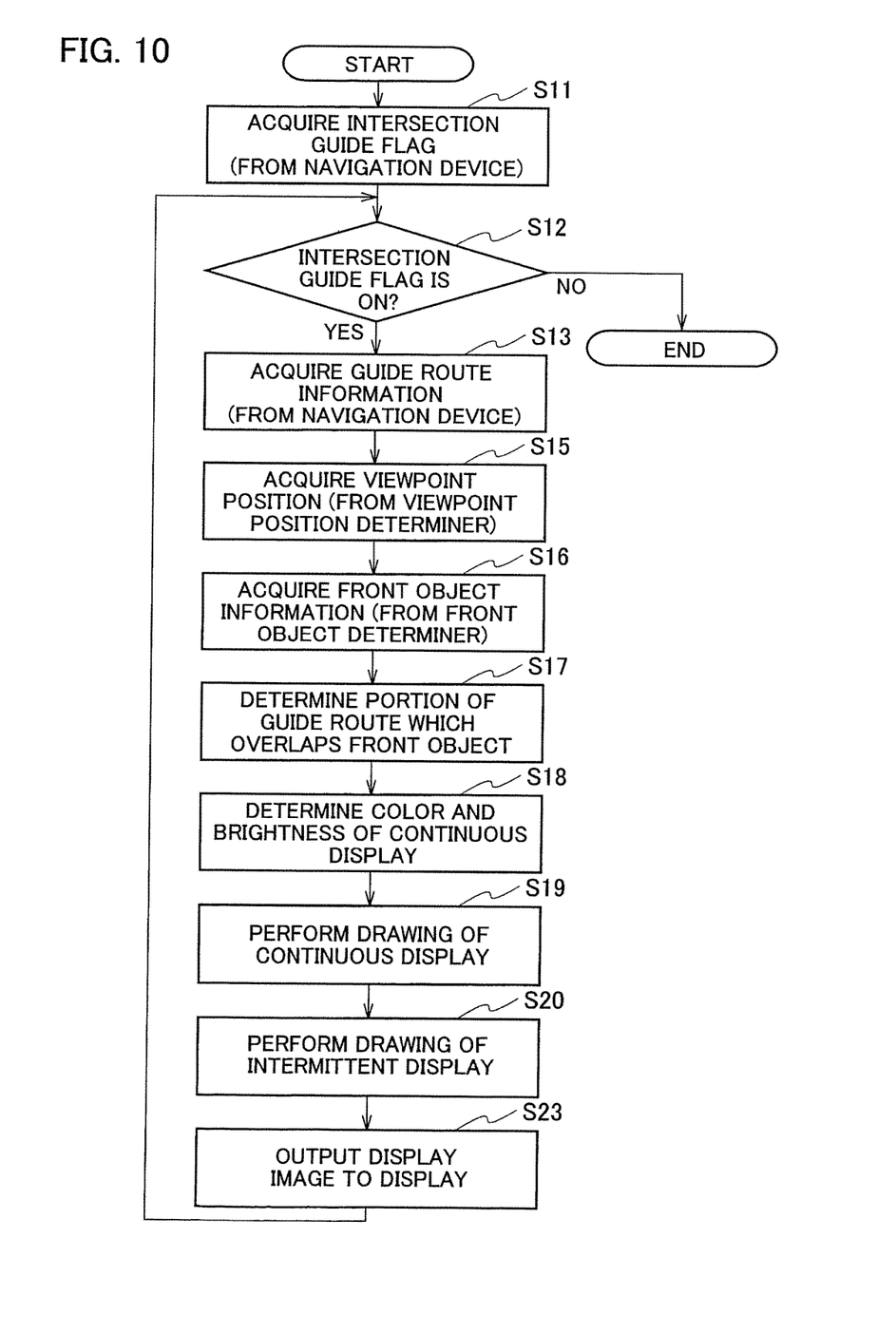
FIG. 10 is a flowchart for explaining an operation of a vehicular display device according to one or more embodiments of the present invention.

FIG. 10 is a flowchart illustrating the operation of the vehicular display device according to one or more embodiments of the present invention. Note that in the following description, steps similar to the vehicular display device according to one or more of the above embodiments are denoted by the same reference numerals as those for the steps of the processes in the vehicular display device according to one or more embodiments of the present invention illustrated in FIG. 2, and description thereof is omitted.

Figure 2:
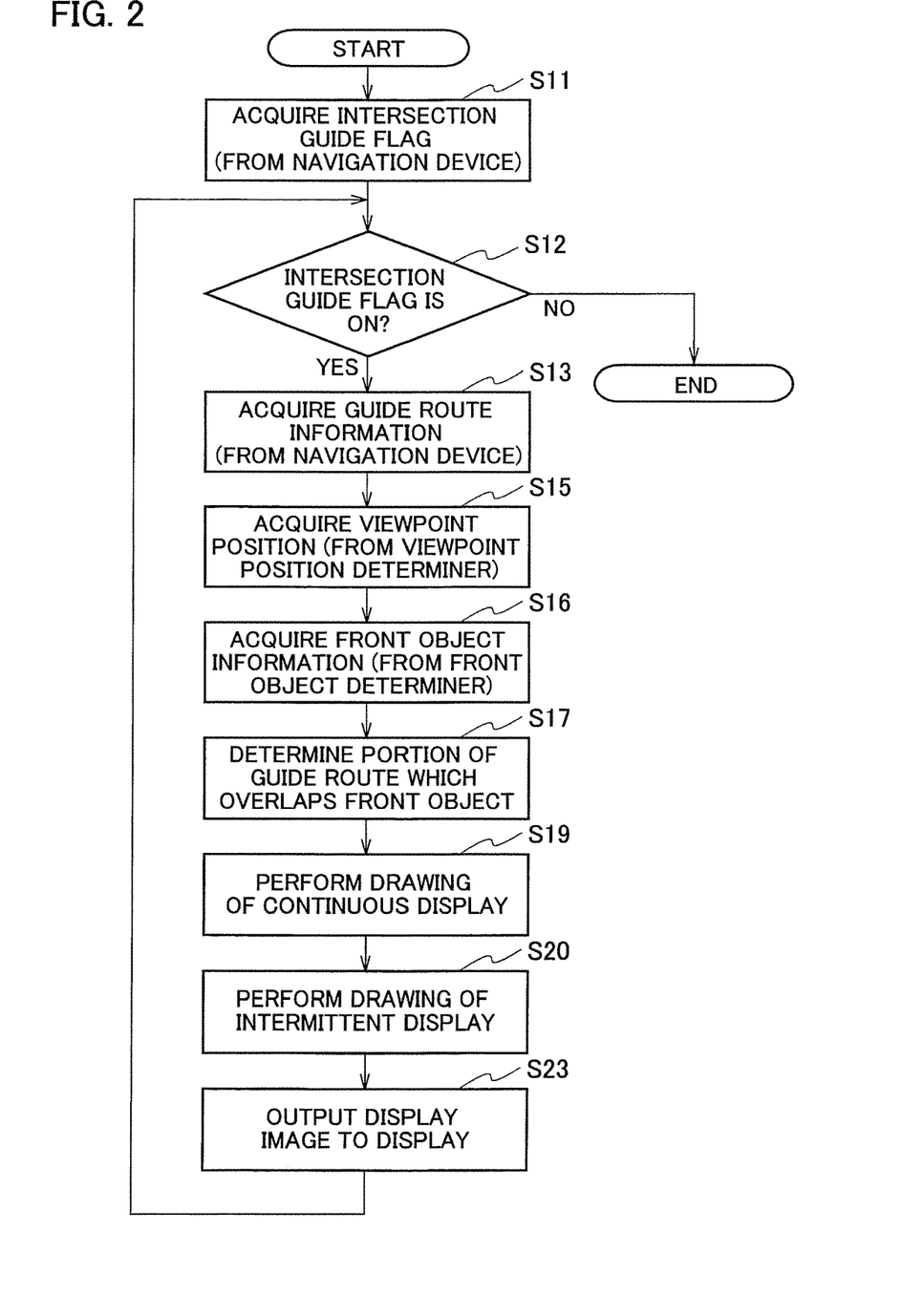
FIG. 2 is a flowchart for explaining an operation of the vehicular display device according to one or more embodiments of the present invention.

Since processes in step S11 to S17 are the same as those illustrated in FIG. 2, description thereof is omitted herein.

After the process of step S17, the color and brightness of continuous display are determined (step S18). Specifically, the display controller 18 determines the color and brightness of the continuous figure, specifically, the continuous line to be used in the drawing of the continuous display performed in subsequent step S19.

Next, the drawing of the continuous display is performed (step S19). Specifically, the display controller 18 draws the guide route in the portion where the guide route determined in step S17 and the object (vehicle) overlap each other in the display region on the windshield, by using a continuous figure, specifically, a continuous line with the color and brightness determined in step S18. Next, the drawing of the intermittent display is performed (step S20).

Then, the display image is outputted to the display 19 (step S23). Thereafter, the sequence returns to step S12 and the aforementioned processes are repeated.

Figure 11:
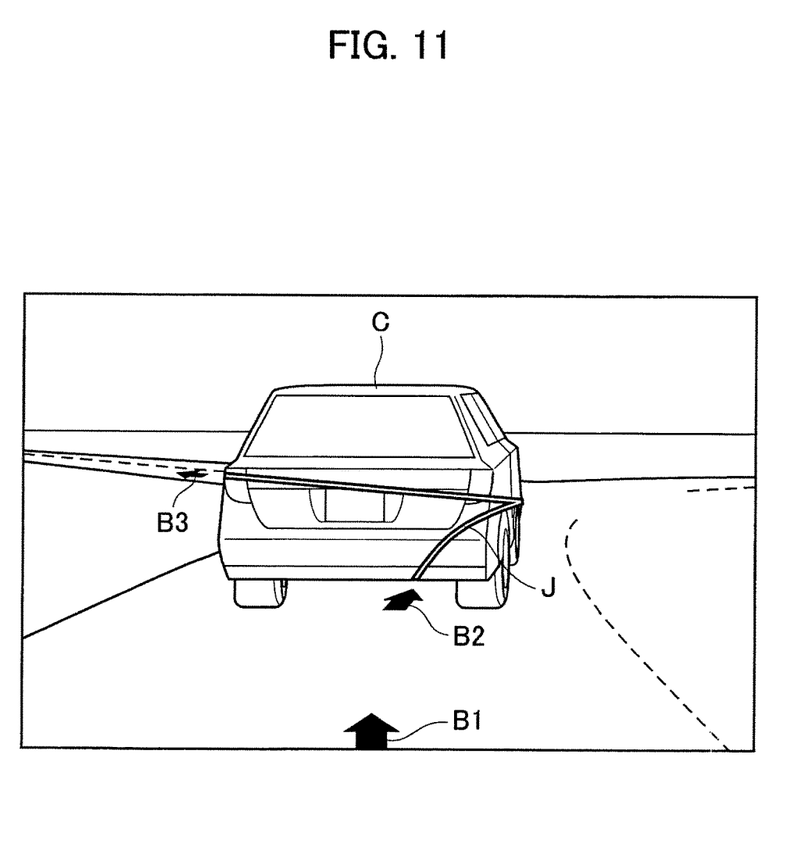
FIG. 11 is a view illustrating an example in which the color and brightness of the guide route in the portion where the guide route and the object overlap each other in the display region on the windshield are changed and displayed in the vehicular display device according to one or more embodiments of the present invention.

As described above, the vehicular display device according to one or more embodiments of the present invention draws the guide route in the portion where the guide route calculated by the navigation device 13 and the object determined by the front object determiner 15 overlap each other in the display region on the windshield, by using the continuous line emphasized by changing the color and brightness thereof. Accordingly, as illustrated in FIG. 11, the color of a portion J where the guide route and the preceding object C overlap each other in the display region on the windshield can be changed, depending on the color of the object C, to a complementary color of the background or the overlapping portion J can be made brighter when the background is bright. Thus, the displayed image can be made more noticeable.

Note that, although the vehicular display device is configured to change the color and brightness of the continuous line used to draw the guide route in the portion where the guide route and the object (vehicle) overlap each other in the display region on the windshield in one or more of the aforementioned embodiments, the vehicular display device may be configured to change at least one of the color and brightness.

A configuration of a vehicular display device according to one or more embodiments of the present invention described below is similar to the configuration of the vehicular display device according to one or more embodiments of the present invention illustrated in FIG. 1, but the operation thereof is different. Accordingly, description is given below mainly of the operation.

Figure 12:
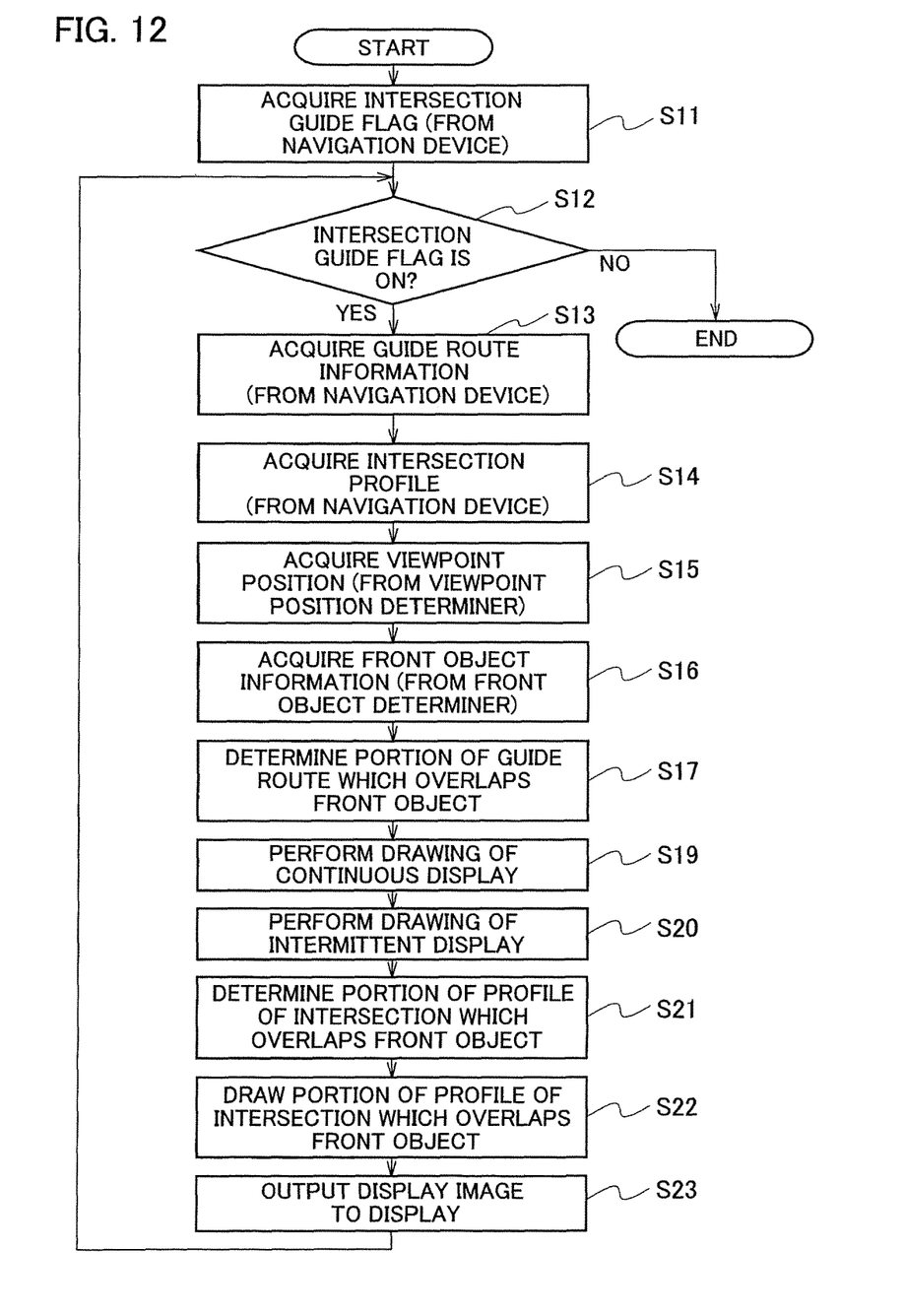
FIG. 12 is a flowchart for explaining an operation of a vehicular display device according to one or more embodiments of the present invention.

FIG. 12 is a flowchart illustrating the operation of the vehicular display device according to one or more embodiments of the present invention. Note that, in the following description, steps similar to the vehicular display device according to one or more of the above embodiments are performed are denoted by the same reference numerals as those for the steps of the processes in the vehicular display device according to one or more embodiments of the present invention illustrated in FIG. 2, and description thereof is simplified.

Since processes in step S11 to S19 are the same as those illustrated in FIG. 2, description thereof is omitted herein.

After the process of step S19, the drawing of the intermittent display is performed (step S20). Next, a portion where the profile of the intersection and the object in front of the vehicle overlap each other in the display region on the front windshield is determined (step S21). Specifically, the display controller 18 determines a portion where the profile of the intersection indicated by the intersection profile information acquired in step S14 and the shape of the object acquired in step S16 overlap each other.

Next, the portion of the profile of the intersection which overlaps the object in front of the vehicle is drawn (step S22). Specifically, the display controller 18 draws the profile of the intersection determined in step S21. Then, the display image is outputted to the display 19 (step S23). Thereafter, the sequence returns to step S12 and the aforementioned processes are repeated.

Figure 13:
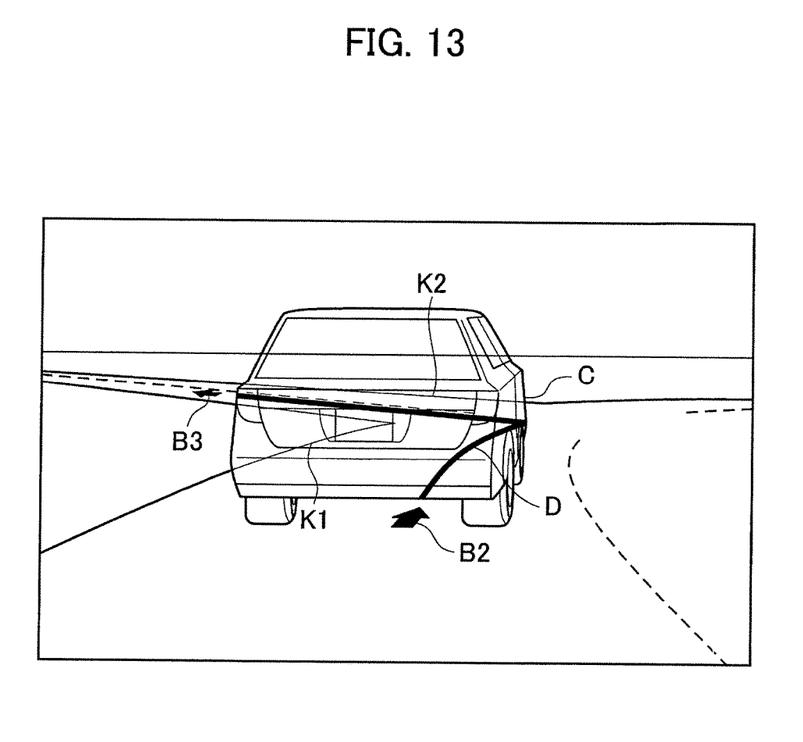
FIG. 13 is a view illustrating an example in which a portion where the guide route and the object overlap each other in the display region on the front window is displayed as if a driver can see through the object in the vehicular display device according to one or more embodiments of the present invention.

The vehicular display device according to one or more embodiments of the present invention draws the portion of the intersection where the profile of the intersection acquired from the navigation device 13 and the object determined by the front object determiner 15 overlap each other in the display region on the windshield. Accordingly, as illustrated in FIG. 13, intersections K1 and K2 which are portions hidden behind the preceding object C can be displayed as if the driver can see through the object C. Hence, the driver can know the conditions of the intersections K1 and K2 in detail.

Note that, although the description is given of the example where the profile of the intersection is drawn as if the driver can see through the vehicle in one or more embodiments of the present invention, this can be applied not only to the profile of the intersection but also to the profile of a general road. For example, when the guide route is curved and the state of the curve is hidden behind the object (vehicle) and is invisible, the curve can be displayed as if the driver can see through the object (vehicle). Accordingly, the driver can know how the road is curved in detail.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

11 GPS antenna
12 geomagnetic sensor
13 navigation device
14 front camera
15 front object determiner
16 viewpoint detection camera
17 viewpoint position determiner
18 display controller
19 display
21 intersection data
22 map data
23 acceleration sensor
24 gyroscope sensor
25 calculator

The invention claimed is:
1. A vehicular display device configured to display a guide route to a destination of a host vehicle, the vehicular display device comprising:

a navigation device configured to calculate the guide route along which the host vehicle is to be guided to travel;

a front camera configured to capture a forward view ahead of the host vehicle;

a front object determination processor configured to determine a vehicle on a traveling road surface in front of the host vehicle based on an image of the forward view captured by the front camera;

a display controller configured to draw the guide route, wherein the guide route comprises a first portion and a second portion, wherein the first portion of the guide route is represented by a continuous line and the second portion of the guide route is represented by intermittent figures, wherein the first portion of the guide route is a portion of the guide route calculated by the navigation device that overlaps a position of the vehicle on the traveling road surface in front of the host vehicle determined by the front object determination processor in a display region on a windshield, and wherein the second portion of the guide route is a portion of the guide route calculated by the navigation device that does not overlap the position of the vehicle on the traveling road surface in front of the host vehicle determined by the front object determination processor in the display region on the windshield; and a display configured to display an image drawn by the display controller in the display region provided to overlap a position of the windshield, wherein the first portion of the guide route is represented by the continuous line at an entirety of the portion of the guide route that overlaps the position of the vehicle on the traveling road surface in front of the host vehicle.

2. The vehicular display device according to claim 1, wherein the display controller is configured to draw an arrow indicating a traveling direction at a front end of a continuous line segment in the first portion of the guide route.

3. The vehicular display device according to claim 1, wherein the display controller is configured to draw a continuous line segment in the first portion of the guide route such that a first end and a second end of the continuous line segment are extended to the intermittent figures in the second portion of the guide route, respectively.

4. The vehicular display device according to claim 1, wherein the display controller is configured to draw the first portion of the guide route differently from the second portion of the guide route in at least one of a color or a brightness.

5. The vehicular display device according to claim 1, wherein the display controller is configured to draw a road profile in the first portion of the guide route.

* * * * *